(12) United States Patent
Yu et al.

(10) Patent No.: US 8,374,442 B2
(45) Date of Patent: Feb. 12, 2013

(54) LINEAR SPATIAL PYRAMID MATCHING USING SPARSE CODING

(75) Inventors: Kai Yu, San Jose, CA (US); Jianchao Yang, Santa Clara, CA (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 880 days.

(21) Appl. No.: 12/469,073

(22) Filed: May 20, 2009

(65) Prior Publication Data

US 2010/0124377 A1 May 20, 2010

Related U.S. Application Data

(60) Provisional application No. 61/116,080, filed on Nov. 19, 2008.

(51) Int. Cl.
  *G06K 9/62* (2006.01)
  *G06K 9/46* (2006.01)
  *G06K 9/48* (2006.01)

(52) U.S. Cl. ............... 382/224; 382/190; 382/241

(58) Field of Classification Search ......... 382/224, 382/190, 241
See application file for complete search history.

(56) References Cited

U.S. PATENT DOCUMENTS

| | | | | |
|---|---|---|---|---|
| 2004/0105491 | A1* | 6/2004 | Bayazit | 375/240.01 |
| 2005/0238198 | A1* | 10/2005 | Brown et al. | 382/103 |
| 2007/0165924 | A1* | 7/2007 | Nicponski | 382/128 |
| 2007/0280530 | A1* | 12/2007 | Fung et al. | 382/159 |
| 2009/0324026 | A1* | 12/2009 | Kletter | 382/124 |
| 2010/0014776 | A1* | 1/2010 | Marchesotti | 382/275 |

OTHER PUBLICATIONS

A. Bosch, A. Zisserman, and X. Munoz. Image classification using random forests and ferns. International Conference on Computer Vision (ICCV), 2007.
S. Lazebnik, C. Schmid, and J. Ponce. Beyond bags of features: Spatial pyramid matching for recognizing natural scene categories. IEEE Conference on Computer Vision and Pattern Recognition (CVPR), 2006.
J. Mairal, F. Bach, J. Ponce, G. Sapiro, and A. Zisserman. Supervised dictionary learning. Neural Information Processing Systems, 2009.
J. Malik, S. Belongie, T. Leung, and J. Shi. Sparse representation for color image restoration. IEEE Transaction on Image Processing, 2008.
M. Ranzato, F. Huang, Y. Boureau, and Y. LeCun. Unsupervised learning of invariant feature hierarchies with applications to object recognition. IEEE Conference on Computer Vision and Pattern Recognition (CVPR), 2007.
T. Serre, L. Wolf, and T. Poggio. Object recognition with features inspired by visual cortex. IEEE Conference on Computer Vision and Pattern Recognition (CVPR), 2005.
L. Yang, R. Jin, R. Sukthankar, and F. Jurie. Unifying discriminative visual codebook generation with classifier training for object category recognition. IEEE Conference on Computer Vision and Pattern Recognition (CVPR), 2008.

* cited by examiner

*Primary Examiner* — Kathleen Y Dulaney
(74) *Attorney, Agent, or Firm* — Bao Tran; Joseph Kolodka

(57) ABSTRACT

Systems and methods are disclosed to classify an input image by determining a spatial-pyramid image representation based on sparse coding; determining a descriptor for each interest point in the input image; encoding the descriptor; and applying max pooling to form the spatial pyramid representation of images.

16 Claims, 4 Drawing Sheets

LINEAR SPATIAL PYRAMID MATCHING USING SPARSE CODING

The present application claims priority to U.S. Provisional Application Ser. No. 61/116,080 filed Nov. 19, 2008, the content of which is incorporated by reference.

BACKGROUND

The present invention relates to automated classification of images.

Image classification systems take images (or video frames) as inputs, and output the labels indicating the semantic categories of the input images. It has wide applications in face recognition, object recognition, scene classification, and hand-written recognition, among others. In many state-of-the-art image classification systems, the key components include two parts, one is feature extraction, and the other is the classifier.

In practice, visual patterns have a high degree of variations in scale, translation, illumination, and deformation. Therefore an ideal feature extractor has to be invariant to these changes. To this end, feature extractions should be able to get those salient features. On the other side, the classifier should be trained on a large number of training examples and able to efficiently process each image to be categorized.

One popular model for representing an image for categorization is the bag-of-features model, which is based on collections of appearance descriptors (e.g., SIFT descriptors, Geometric-Blur, SURF, image patches, among others) extracted from local patches. The method treats an image as a collection of unordered appearance descriptors extracted from local patches, quantizes them into discrete "visual words", and then computes a compact histogram representation for semantic image classification, e.g. object recognition or scene categorization. The key idea behind the bag-of-features model is to quantize the continuous high-dimensional feature space into discrete "visual words", and then compute the compact histogram representation of the collection of features by assigning each local feature to its nearest "visual word". Spatial pyramid machine (SPM) kernel represents the state-of-the-art method that extends the "bagk-of-words" approach to further consider the spatial structure of the visual words under several different scales. Under this SPM representation, classifiers using support vector machines (SVMs) using nonlinear kernel functions have achieved very good accuracy in image classification.

The BoF approach discards the spatial order of local descriptors, which severely limits the descriptive power of the image representation. By overcoming this problem, one particular extension of the BoF model, called spatial pyramid matching (SPM), has made a remarkable success on a range of image classification benchmarks, and was the major component of the state-of-the-art systems, e.g., The method partitions an image into $2^l \times 2^l$ segments in different scales l=0, 1, 2, computes the BoF histogram within each of the 21 segments, and finally concatenates all the histograms to form a vector representation of the image. In case where only the scale l=0 is used, SPM reduces to BoF.

People have empirically found that, in order to obtain good performances, both BoF and SPM must be applied together with a particular type of nonlinear Mercer kernels, e.g. the intersection kernel or the Chi-square kernel. Accordingly, the nonlinear SVM has to pay a computational complexity $O(n^3)$ and a memory complexity $O(n^2)$ in the training phase, where n is the training size. Furthermore, since the number of support vectors grows linearly with n, the computational complexity in testing is $O(n)$. This scalability implies a severe limitation - - - it is nontrivial to apply them to real-world applications, whose training size is typically far beyond thousands.

The bag-of-features model and SPM approach both employ vector quantization (VQ) to extract visual words. VQ is a very coarse coding method which does not capture the salient property of images. As the consequence, the classifier has to employ additional operations to get a good performance, which makes the training procedure very expensive and the testing procedure slow. To date, this state-of-the-art approach can handle only several thousands of training examples.

SUMMARY

Figure 1:
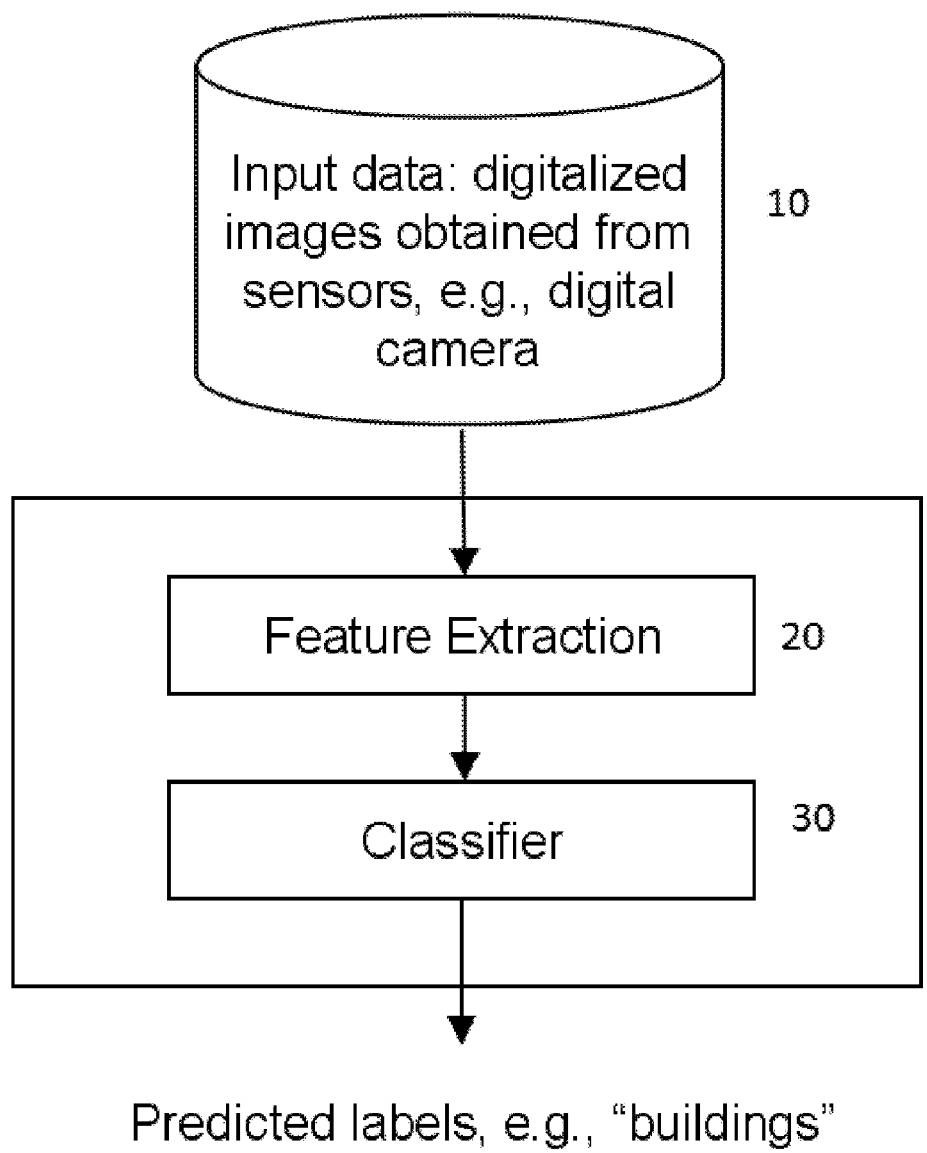
FIG. 1 shows an exemplary image classification system.

Systems and methods are disclosed to classify an input image by determining a spatial-pyramid image representation based on sparse coding; determining a descriptor for each interest point in the input image; encoding the descriptor; and applying max pooling to form the spatial pyramid representation of images.

Implementations of the above aspects may include one or more of the following. The interest point detection can include scanning the input image and detecting a set of key points representing the objects in the input image. Key points can be located on a predefined grid. The system can determine a descriptor for each interest point or a descriptor feature vector to represent a visual pattern at a predetermined location. The descriptor can be a raw image patch or a transformed representation of the raw image patch. The transformed representation can be a local feature, a SIFT feature, or a SURF feature. A nonlinear transformation can be used to encode each descriptor into a compact representation. The system can apply local max pooling on multiple spatial scales to incorporate translation and scale invariance. The system can determine a spatial pyramid representation of the image. The system can determine statistics of the codes for each region of the input image in a set of locations and scales, and concatenate the statistics to form a vector. Code statistics can be generated by computing a Least Mean Square or a Root Mean Square of the codes, or an absolute value of the codes. The system can apply a linear support vector machine (SVM) based on the sparse coding of a local feature. The linear SVM kernel can be used and wherein an image $I_i$ is represented by $z_i$, where the system determines $$\kappa(z_i, z_j) = z_i^T z_j = \sum_{l=0}^{2} \sum_{s=1}^{2^l} \sum_{t=1}^{2^l} \langle z_i^l(s,t), z_j^l(s,t) \rangle$$

where $\langle z_i, z_j \rangle = z_i^T z_j$, and $z_i^l(s,t)$ comprise max pooling statistics of descriptor sparse codes in the (s,t)-th segment of image $I_i$ in the scale level l. The linear SVM can be a binary SVM decision function $$f(z) = \left(\sum_{i=1}^{n} \alpha_i z_i\right)^T z + b = w^T z + b$$

The system can apply a pooling function F as a max pooling function on absolute sparse codes $$z_j = \max\{|u_{1j}|, |u_{2j}|, \ldots, |u_{Mj}|\},$$

where $z_j$ is the j-th element of z, $u_{ij}$ is the matrix element at i-th row and j-th column of U, and M is the number of local descriptors in the region. An unconstrained convex optimization problem can be solved as follows:

$$\min_{w_c} \left\{ J(w_c) = \|w_c\|^2 + C \sum_{i=1}^{n} l(w_c; y_i^c, z_i) \right\}$$

where $y_i^c = 1$ if $y_i = c$, otherwise $y_i^c = -1$, and $l(w_c; y_i^c, z_i)$ is a hinge loss function.

The system can perform sparse coding followed by multi-scale spatial max pooling and applying a linear SVM kernel based on SIFT sparse codes.

Advantages of the preferred embodiment may include one or more of the following. The system extracts salient image features, be trained on large-scale training data, and classify each image in a constant time. The image classification system employs sparse coding, instead of VQ, to learn a good basis for capturing the salient property of images. The high quality of feature extraction enables an efficient linear SVM sufficient to ensure excellent classification accuracy. The system has a linear complexity to the size of training data, and has a constant complexity in classifying new images. It can easily handle millions of training examples. The system can be used in many real-world image classification problems, including face recognition, object recognition, scene classification, gender recognition, age recognition, hand-written recognition, and many other problems. The system is high in accuracy: due to the way of extracting more salient features, the accuracy of image classification systems can be greatly improved. The system is also efficient—the training can easily make use of millions of training examples, and can process each new image to be classified in a constant time.

DESCRIPTION

FIG. 1 shows an exemplary image classification system with a feature extractor 10 and a classifier 20. The system takes an image as input, and outputs a label, e.g., "buildings". In FIG. 1, arrow lines represent data flow, and each box represents a computation step or a data processing device. The processing of image feature extraction takes an image as input, and outputs a feature vector as a new representation of the image, which will be subsequently used as input to the classifier.

The system determines a spatial-pyramid image representation based on sparse codes (SC) of SIFT features, instead of the K-means vector quantization (VQ) in the traditional SPM. The approach is naturally derived by relaxing the restrictive cardinality constraint of VQ. Furthermore, unlike conventional SPM that performs spatial pooling by computing histograms, the system of FIG. 1 uses max spatial pooling that is more robust to local spatial translations. The new image representation captures more salient properties of visual patterns, and turns out to work well with linear classifiers. The use of simple linear SVMs dramatically reduces the training complexity and a constant complexity in testing, while still achieving even better classification accuracy in comparison with the traditional nonlinear SPM approach.

Figure 2:
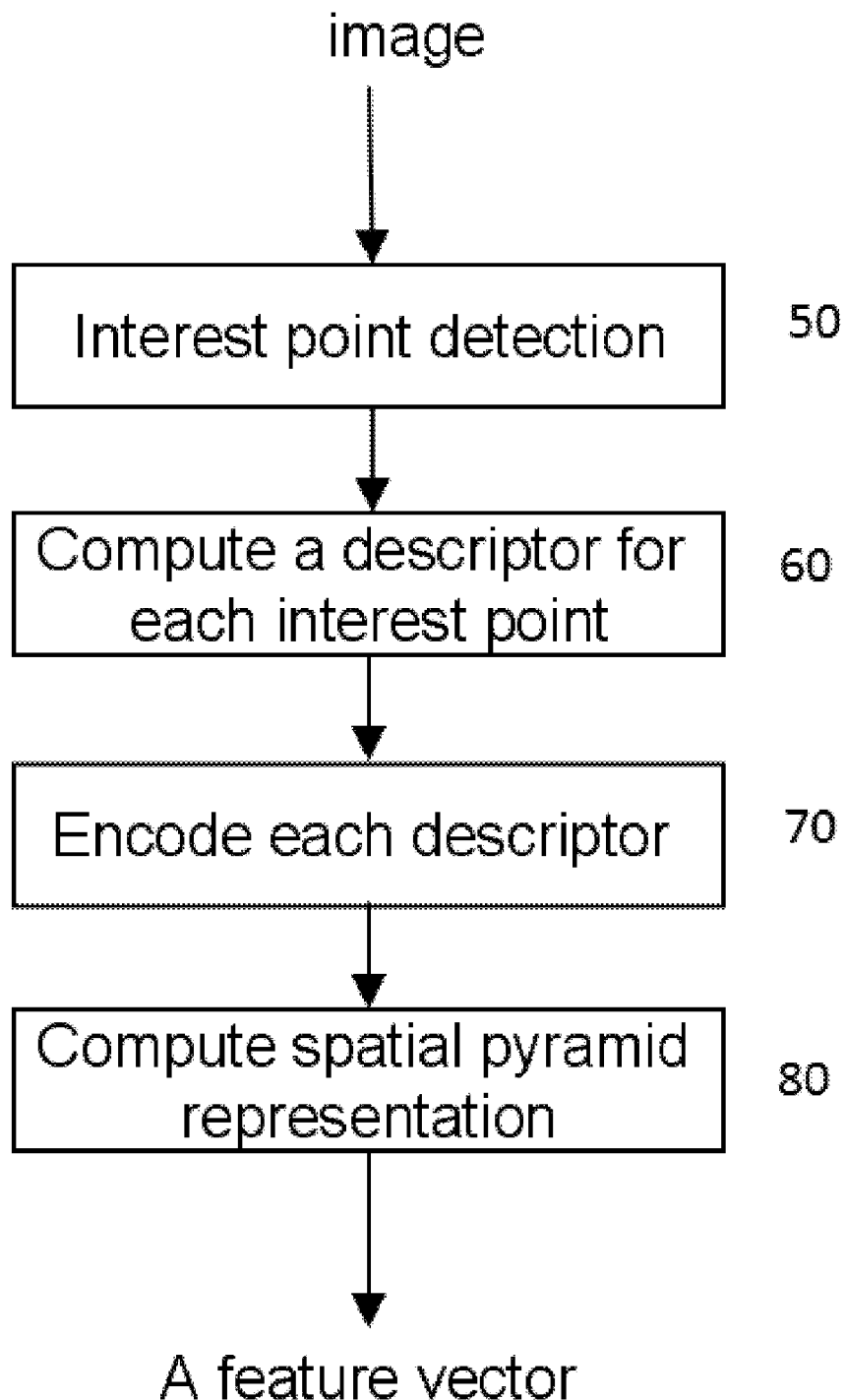
FIG. 2 shows an exemplary process to classify feature vectors for the system of FIG. 1.

The system includes four major modules, as shown in FIG. 2. First, the system performs interest point detection in 50. The system scans over the input image and detects a set of key points that are informative in representing the objects in this image. The simplest way is to let the key points be locations on a predefined grid.

Next, the system determines a descriptor for each interest point in 60. For the patch with a predefined size centered on an interest point, the system computes a descriptor feature vector to represent the visual pattern at this particular location. This descriptor can be the raw image patch, or some transformed representation, like SIFT feature or SURF feature.

The system then encodes each descriptor in 70. In one embodiment, the system uses Sparse Coding to encode the descriptor. The system performs a nonlinear transformation to encode each descriptor into a more compact implementation. For example, vector quantization (VQ) retrieves the ID of the prototype in a pre-obtained dictionary of descriptor prototypes, which is the most similar to the encoded descriptor. While Sparse coding returns the weights of a small set of bases from a basis dictionary, where the linear combination of this small set can well approximate the to-be-encoded descriptor.

In 80, the system computes a spatial pyramid representation. This is done by determining statistics of the codes for every region of the image, in a set of locations and scales, and concatenates them to form a longer vector. The result is a spatial pyramid representation. In one embodiment, the system determines code statistics by computing the Root Mean Square of the codes.

The use of sparse coding provides a number of advantages. First, compared with the VQ coding, sparse coding can achieve a much lower reconstruction error due to the less restrictive constraint. Second, sparsity allows the representation to be specialized, and to capture salient properties of images. Third, research in image statistics reveals that image patches are sparse signals.

Figure 3:
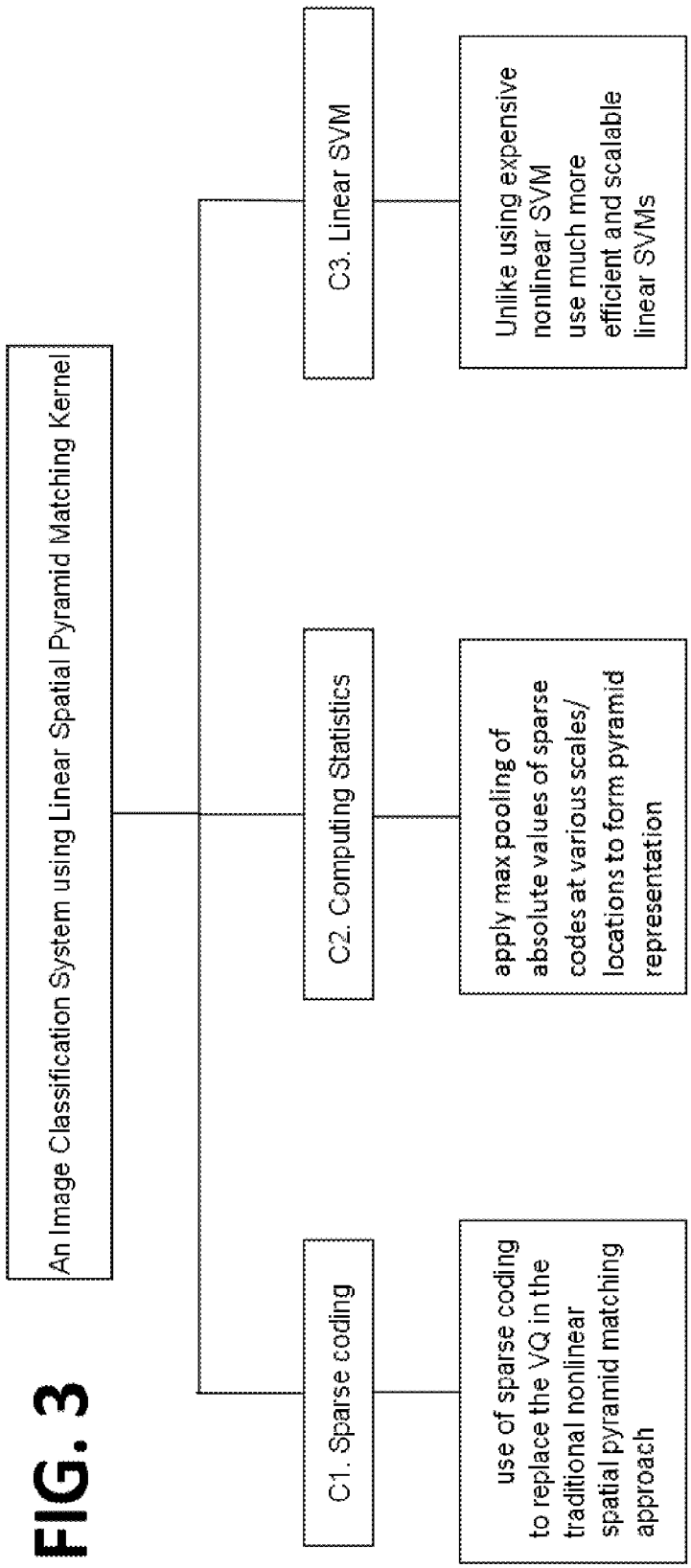
FIG. 3 shows an exemplary image classification system.

FIG. 3 shows an exemplary image classification system. The system uses a linear spatial pyramid matching kernel 100. The kernel uses a sparse coding engine 102. The sparse coding engine 102 replaces the VQ of conventional spatial pyramid matching engines 104. The kernel 100 also has a statistics engine 112. The engine 112 includes a root mean squares determining module 114 as features to form the pyramid. The kernel 100 also has a linear SVM 122 which replaces the nonlinear SVMs of the kernel 100.

The system of FIG. 3 uses a spatial pyramid matching approach based on SIFT sparse codes for image classification. The system uses selective sparse coding instead of traditional vector quantization to extract salient properties of appearance descriptors of local image patches. Furthermore, instead of averaging pooling in the histogram, sparse coding enables the system to operate local max pooling on multiple spatial scales to incorporate translation and scale invariance.

In one embodiment, the process generalizes vector quantization to sparse coding followed by multi-scale spatial max pooling and the use of a linear SPM kernel based on SIFT sparse codes. This approach reduces the complexity of SVMs.

Next, the generation of sparse coding will be discussed. A conventional vector quantization (VQ) method applies the K-means clustering algorithm to solve the following problem $$\min_V \sum_{m=1}^M \min_{k=1\ldots K} \|x_m - v_k\|^2$$

where X is a set of SIFT appearance descriptors in a D-dimensional feature space, i.e. $X=[x_1, \ldots, x_M]^T \in R^{M \times D}$ and where $V=[v_1, \ldots, v_K]^T$ are the K cluster centers to be found, called codebook, and P·P denotes the L2-norm of vectors. The optimization problem can be re-formulated into a matrix factorization problem with cluster membership indicators $U=[u_1, \ldots, u_M]^T$, $$\min_{U,V} \sum_{m=1}^M \|x_m - u_m V\|^2$$

subject-to $Card(u_m)=1, |u_m|=1, u_m \pm 0, \forall m$ where $Card(u_m)=1$ is a cardinality constraint, meaning that only one element of $u_m$ is nonzero, $u_m \pm 0$ means that all the elements of $u_m$ are nonnegative, and $|u_m|$ is the L1-norm of $u_m$, the summation of the absolute value of each element in $u_m$. After the optimization, the index of the only nonzero element in $u_m$ indicates which cluster the vector $x_m$ belongs to. In the training phase of VQ, the optimization is solved with respect to both U and V. In the coding phase, the learned V will be applied for a new set of X and only U is solved.

In sparse coding (SC), the constraint $Card(u_m)=1$ is relaxed by putting a L1-norm regularization on $u_m$, which enforces $u_m$ to have a small number of nonzero elements. Then the VQ formulation is turned into:

$$\min_{U,V} \sum_{m=1}^M \|x_m - u_m V\|^2 + \lambda |u_m|$$

subject-to $\|v_k\| \leq 1, \forall k=1, 2, \ldots, K$ where a unit L2-norm constraint on $v_k$ is typically applied to avoid trivial solutions. Normally, the codebook V is an over-complete basis set, i.e. K>D.

Similar to VQ, SC has a training phase and a coding phase. First, a descriptor set X from a random collection of image patches is used to solve the above equation with respect to U and V, where V is retained as the codebook. In the coding phase, for each image represented as a descriptor set X, the SC codes are obtained by optimizing with respect to U only.

SC is used to derive image representations because it has a number of attractive properties. First, compared with the VQ coding, SC coding can achieve a low reconstruction error due to the less restrictive constraint. Second, sparsity allows the representation to be specialized and to capture salient properties of images. Third, research in image statistics clearly reveals that image patches are sparse signals.

In one embodiment, the optimization problem is convex in V (with U fixed) and convex in U (with V fixed), but not in both simultaneously. The optimization can be solved iteratively by alternatingly optimizing over V or U while fixing the other. Fixing V, the optimization can be solved by optimizing over each coefficient $u_m$ individually:

$$\min_{u_m} \|x_m - u_m V\|_2^2 + \lambda |u_m|.$$

This is essentially a linear regression problem with $L_1$ norm regularization on the coefficients, also known as Lasso in the Statistical literature. The optimization can be solved very efficiently by algorithms such as the feature-sign search algorithm. Fixing U, the problem reduces to a least square problem with quadratic constraints:

$$\min_V \|X - UV\|_F^2$$

s.t. $\|v_k\| \leq 1, \forall k=1, 2, \ldots, K.$

The optimization can be done efficiently by the Lagrange dual.

One embodiment uses linear SVMs based SC of SIFT. If U is the result of applying the sparse coding to a descriptor set X, assuming the codebook V to be pre-learned and fixed, the process of FIG. 1 determines the following image feature by a pre-chosen pooling function $z=F(U),$ where the pooling function F is defined on each column of U. Different pooling functions construct different image statistics. For example, the underlying pooling function is defined as the averaging function, yielding the histogram feature. One embodiment defines the pooling function F as a max pooling function on the absolute sparse codes $z_j = \max\{|u_{1j}|, |u_{2j}|, \ldots, |u_{Mj}|\},$ where $z_j$ is the j-th element of z, $u_{ij}$ is the matrix element at i-th row and j-th column of U, and M is the number of local descriptors in the region.

Similar to the construction of histograms in SPM, the system applies the above max pooling on a spatial pyramid constructed for an image. By max pooling across different locations and over different spatial scales of the image, the pooled feature is more robust to local transformations than mean statistics in histogram. The pooled features from various locations and scales are then concatenated to form a spatial pyramid representation of the image.

In one implementation, a simple linear SPM kernel is used where an image $I_i$ is represented by $z_i$, $$\kappa(z_i, z_j) = z_i^T z_j = \sum_{l=0}^{2} \sum_{s=1}^{2^l} \sum_{t=1}^{2^l} \langle z_i^l(s,t), z_j^l(s,t) \rangle$$

where $\langle z_i, z_j \rangle = z_i^T z_j$, and $z_i^l(s,t)$ is the max pooling statistics of the descriptor sparse codes in the (s,t)-th segment of image $I_i$ in the scale level l. Then the binary SVM decision function becomes $$f(z) = \left(\sum_{i=1}^n \alpha_i z_i\right)^T z + b = w^T z + b$$

The linear SPM kernel based on sparse coding statistics always achieves excellent classification accuracy. This success is largely due to three factors: (1) SC has much less quantization errors than VQ; (2) It is well known that image patches are sparse in nature, and thus sparse coding is particularly suitable for image data; (3) The computed statistics by max pooling are more salient and robust to local translations.

The use of sparse coding to replace VQ coding, and the computation of root square mean, in forming the spatial pyramid representation of images, enable the use of simpler linear models to do classification. The system of FIG. 3 achieves a higher efficiency and scalability in training and a faster speed in classification while still ensuring very good accuracy.

In a number of image categorization experiments, in terms of classification accuracy, the suggested linear SPM based on sparse coding of SIFT descriptors significantly outperforms the linear SPM kernel on histograms, and is even better than the nonlinear SPM kernels, leading to state-of-the-art performance on several benchmarks by using a single type of descriptors.

In one implementation, given the training data $\{(z_i, y_i)\}_{i=1}^n$, $y_i \in Y = \{1, \ldots, L\}$, a linear SVM learns L linear functions $\{w_c^T z | c \in Y\}$, such that, for a test datum z, its class label is predicted by $$y = \max_{c \in Y} w_c^T z$$

A one-against-all strategy is used to train L binary linear SVMs, each solving the following unconstraint convex optimization problem $$\min_{w_c} \left\{ J(w_c) = \|w_c\|^2 + C \sum_{i=1}^n \ell(w_c; y_i^c, z_i) \right\}$$

where $Y_i^c = 1$ if $y_i = c$, otherwise $y_i^c = -1$, and $l(w_c; y_i^c, z_i)$ is a hinge loss function. The standard hinge loss function is not differentiable everywhere, which hampers the use of gradient-based optimization methods. A differentiable quadratic hinge loss is used:

$$l(w_c; y_i^c, z_i) = [\max(0, w_c^T z \cdot y_i^c - 1)]^2$$

such that the training can be easily done with simple gradient-based optimization methods such as LBFGS. Other choices like conjugate gradient are also applicable. The implementation also provides the cost J(w) and the gradient $\partial J(w)/\partial w$. The computation linearly scans over the training examples and thus has the linear complexity O(n). In one experiment, the SVM training on about 200,000 examples with 5376-dimensional features was finished in 5 minutes.

Figure 4:
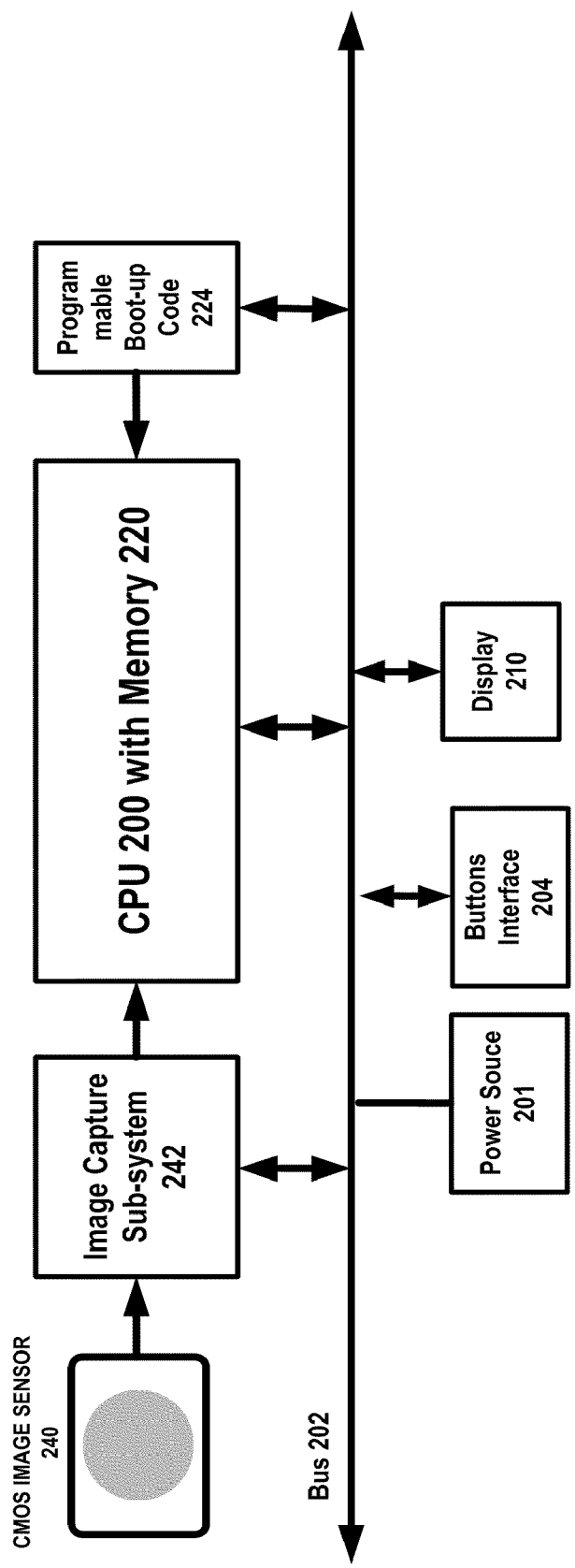
FIG. 4 shows an exemplary block diagram of processing electronics to capture and classify images.

FIG. 4 shows an exemplary block diagram of processing electronics to capture and classify images in accordance with the process of FIG. 1 or FIG. 2. The system of FIG. 7 can be dedicated security camera or can be part of a cell phone or a personal digital assistant or a camera or camcorder. A processor 200 controls all tasks done by the image capture system of FIG. 1. The processor 200 communicates over a bus 202 to various devices, including buttons interface 204, display 210. The processor 200 also communicates with embedded memory 220 and a programmable ROM 224 that contains boot code as well as application code. A rechargeable power source 201 such as a battery can be used to power the camera and processor. The CPU 200 is connected to an image capture sub system 242 which in turn is connected to an image sensor 240 which can be a CMOS sensor.

The above system uses the spatial pyramid matching approach based on SIFT sparse codes for image classification. The method uses selective sparse coding instead of traditional vector quantization to extract salient properties of appearance descriptors of local image patches. Furthermore, instead of averaging pooling in the histogram, sparse coding enables the system to operate local max pooling on multiple spatial scales to incorporate translation and scale invariance.

The obtained image representation works well with simple linear SVMs, which dramatically improves the scalability of training and the speed of testing, and even improves the classification accuracy. The sparse codes of SIFT features can serve as a better local appearance descriptor for general image processing tasks. The system can accelerate the sparse coding by using a feed-forward network. Moreover, the accuracy could be further improved by learning the codebook in a supervised fashion.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A method to classify an input image, comprising
   a. determining a spatial-pyramid image representation based on sparse coding;
   b. determining a descriptor for each interest point in the input image;
   c. encoding the descriptor; and
   d. applying max-pooling to form the spatial-pyramid image representation
   e. solving an unconstrained convex optimization problem $$\min_{w_c} \left\{ J(w_c) = \|w_c\|^2 + C \sum_{i=1}^{n} \ell(w_c; y_i^c, z_i) \right\}$$

where $y_i^c=1$ if $y_i=c$, otherwise $y_i^c=-1$, and $l(w_c; y_i^c, z_i)$ is a hinge loss function, where w is a data vector, z is test datum, C is a constant, and J is a cost function.

2. The method of claim 1, wherein the interest point is detected by scanning the input image and detecting a set of key points representing objects in the input image.

3. The method of claim 2, comprising selecting key points located on a predefined grid.

4. The method of claim 1, comprising determining a descriptor for each interest point.

5. The method of claim 1, comprising determining a descriptor feature vector to represent a visual pattern at a predetermined location.

6. The method of claim 1, wherein the descriptor comprises a raw image patch or a transformed representation of the raw image patch.

7. The method of claim 1, wherein a transformed representation comprises a local feature, a SIFT feature, or a SURF feature.

8. The method of claim 1, comprising performing a non-linear transformation to encode each descriptor into a compact representation.

9. The method of claim 1, comprising applying local max pooling on multiple spatial scales to incorporate translation and scale invariance.

10. The method of claim 1, comprising determining a spatial pyramid representation of the image.

11. The method of claim 1, comprising determining statistics of codes for each region of the input image in a set of locations and scales, and concatenating the statistics to form a vector.

12. The method of claim 1, comprising determining code statistics by computing an absolute value of codes.

13. The method of claim 1, comprising applying a linear support vector machine (SVM) based on a sparse coding of a local feature.

14. The method of claim 13, wherein a linear SVM kernel is used and wherein an image $I_i$ is represented by $z_i$, comprising determining:

$$\sum_{l=0}^{2} \sum_{s=1}^{2^l} \sum_{t=1}^{2^l} \langle z_i^l(s,t), z_j^l(s,t) \rangle$$

where $z_i^l(s,t)$ comprise max pooling statistics of descriptor sparse codes in a (s,t)-th segment of image $I_i$ in a scale level l.

15. The method of claim 1, comprising applying a pooling function F as a max pooling function on absolute sparse codes $$z_j = \max\{|u_{1j}|, |u_{2j}|, \ldots, |u_{Mj}|\},$$

where $z_j$ is a j-th element of z, $u_{ij}$ is a matrix element at i-th row and j-th column of cluster membership indicator U, and M is a number of local descriptors.

16. The method of claim 1, comprising applying sparse coding followed by multi-scale spatial max pooling and applying a linear SVM kernel based on SIFT sparse codes.

* * * * *